(12) United States Patent
Dasgupta et al.

(10) Patent No.: US 10,887,408 B2
(45) Date of Patent: Jan. 5, 2021

(54) REMOTE MONITORING OF NETWORK COMMUNICATION DEVICES

(71) Applicant: HEWLETT PACKARD ENTERPRISE DEVELOPMENT LP, Houston, TX (US)

(72) Inventors: Subhajit Dasgupta, Austin, TX (US); Alexander Kramer, Plano, TX (US); Fred Kuhns, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 135 days.

(21) Appl. No.: 16/057,267

(22) Filed: Aug. 7, 2018

(65) Prior Publication Data

US 2020/0053173 A1    Feb. 13, 2020

(51) Int. Cl.
*H04L 29/08* (2006.01)
*H04L 12/26* (2006.01)
*H04L 12/927* (2013.01)

(52) U.S. Cl.
CPC ........ *H04L 67/22* (2013.01); *H04L 29/08135* (2013.01); *H04L 43/028* (2013.01); *H04L 43/04* (2013.01); *H04L 47/808* (2013.01); *H04L 67/025* (2013.01); *H04L 67/10* (2013.01); *H04L 67/306* (2013.01)

(58) Field of Classification Search
CPC .......... G06F 11/30–302; G06F 11/3065–3086; H04L 41/00; H04L 41/0246–026; H04L 41/085–0856; H04L 41/0866; H04L 41/14–24; H04L 29/08135; H04L 41/0226–0273; H04L 41/056; H04L 43/00–50; H04L 67/025; H04L 67/10
See application file for complete search history.

(56) References Cited

U.S. PATENT DOCUMENTS

| | | | |
|---|---|---|---|
| 8,819,704 B1 * | 8/2014 | Hosaagrahara | G06F 11/006 719/318 |
| 9,038,151 B1 * | 5/2015 | Chua | H04L 45/02 726/6 |
| 9,544,196 B2 * | 1/2017 | Hardy | H04L 41/22 |
| 9,762,476 B1 | 9/2017 | Perevalov et al. | |
| 10,372,595 B1 * | 8/2019 | Chopra | G06F 11/079 |
| 2013/0232382 A1 | 9/2013 | Jain et al. | |
| 2014/0325038 A1 * | 10/2014 | Kis | H04L 41/0803 709/220 |

(Continued)

FOREIGN PATENT DOCUMENTS

| | | |
|---|---|---|
| CN | 206135942 | 4/2017 |
| CN | 106970574 | 7/2017 |

OTHER PUBLICATIONS

Roy, A. et al.; "Passive Realtime Datacenter Fault Detection and Localization"; Feb. 27, 2017; 18 pages.

*Primary Examiner* — Brendan Y Higa

(74) *Attorney, Agent, or Firm* — Nolte Lackenbach Siegel

(57) ABSTRACT

A method of remotely accessing data on a network communication device including submitting a request for data on a network communication device located in a data center from a remote location. The method further including accessing remotely the network communication device located in the data center, collecting the data in the request from the network communication device located in the data center, filtering a user parameter from the data, and providing filtered data to the remote location.

16 Claims, 7 Drawing Sheets

(56) References Cited

U.S. PATENT DOCUMENTS

| | | | |
|---|---|---|---|
| 2015/0074670 A1* | 3/2015 | Gerganov | G06F 9/5027 |
| | | | 718/103 |
| 2015/0113132 A1* | 4/2015 | Srinivas | H04L 41/145 |
| | | | 709/224 |
| 2015/0281072 A1* | 10/2015 | Arumugam | H04L 45/245 |
| | | | 370/392 |
| 2016/0197808 A1* | 7/2016 | Popokh | H04L 43/0817 |
| | | | 370/248 |
| 2016/0283306 A1* | 9/2016 | Hayashi | G06F 11/0709 |
| 2017/0011072 A1* | 1/2017 | Tsirulnik | G06F 16/211 |
| 2017/0048126 A1* | 2/2017 | Handige Shankar | |
| | | | H04L 41/0622 |
| 2017/0186034 A1* | 6/2017 | Mace | G06Q 30/0251 |

* cited by examiner

REMOTE MONITORING OF NETWORK COMMUNICATION DEVICES

BACKGROUND

Network communication devices, such as switches, are used to connect other devices, such as servers or compute modules, to create a network within a data center. Such switches allow for the sharing of resources, serving as a controller, thereby allowing devices on the network to share information and otherwise communicate. During operation, switches receive incoming data packets and redirect the packets to an intended destination within the network.

BRIEF DESCRIPTION OF THE DRAWINGS

Examples described herein may be understood by reference to the following description taken in conjunction with the accompanying drawings, in which like reference numerals identify like elements.

Figure 1:
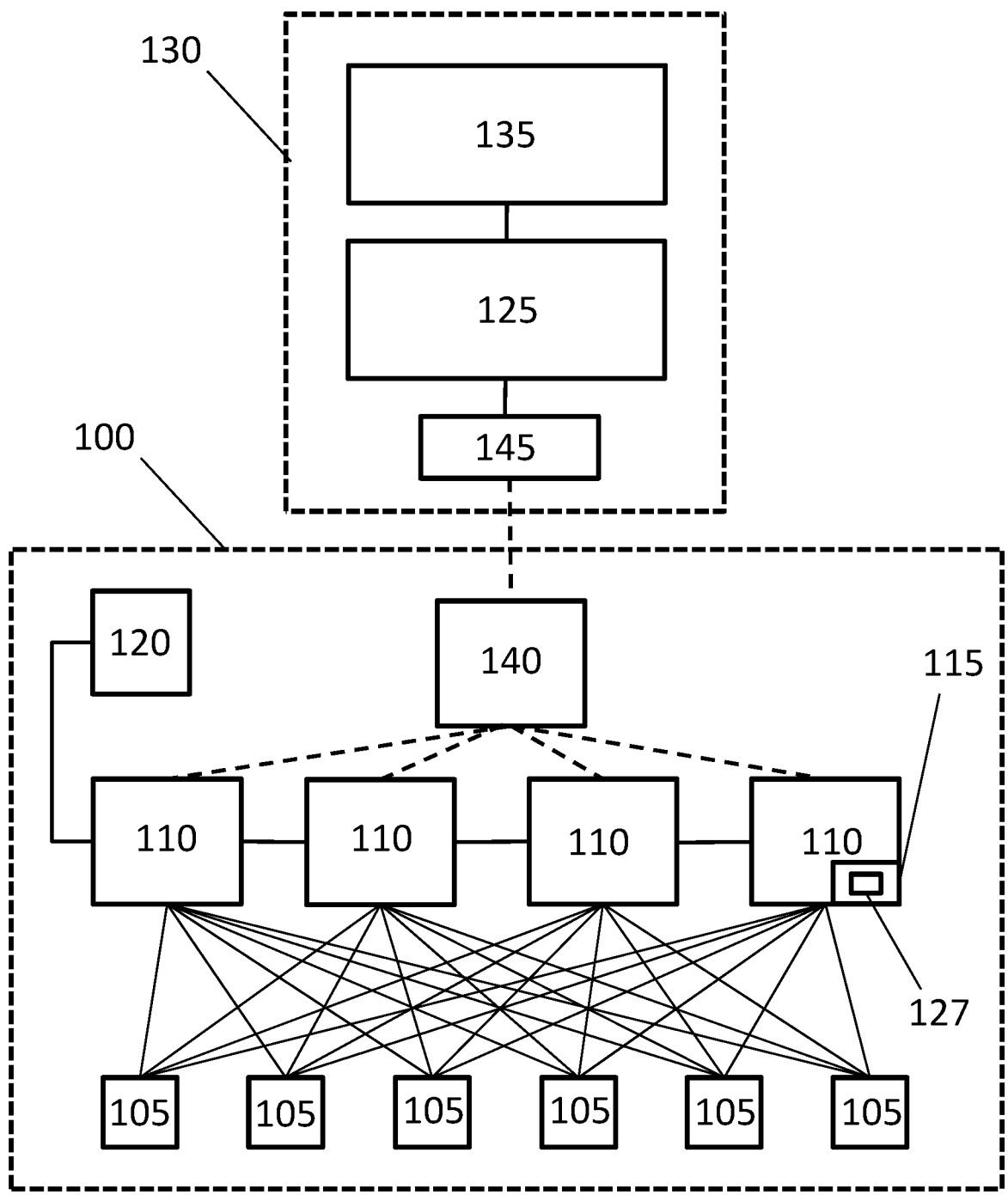
FIG. 1 is a schematic representation for the remote monitoring of network communication devices within a data center in accordance with one or more example embodiments.

While examples described herein are susceptible to various modifications and alternative forms, the drawings illustrate specific examples herein described in detail by way of example. It should be understood, however, that the description herein of specific examples is not intended to be limiting to the forms disclosed, but on the contrary, the intention is to cover all modifications, equivalents, and alternatives falling within the spirit and scope of the examples described herein and the appended claims.

DETAILED DESCRIPTION

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

In the field of network computing, network connectivity between devices, compute nodes, blades, or frames of a scalable computing resource may be implemented using a network communication device. Network communication devices, such as switches, routers, hubs, bridges, etc. represent a primary communication path for sharing data between different types of computing resources generically referred to as "nodes" of a network. The shared data may represent inputs to computing processes (e.g., data or applications), outputs of computing resources (e.g., compute results), communications to coordinate distributed processes, communications between users, and other types of data. In any "intelligent" network communication device there may be a processor, local memory, configuration information, and "current state" information, among other types of information. Collectively, the different types, of information on a network communication device may be considered to represent the overall "device state" at a given point in time. For example, information on a network communication device (including its "device state") is expected to change over time, in part, because while in-service and providing active communication paths for a network, the overall configuration and available devices on that network, may change. In particular, routing information may change as devices become available and go away at different points in the overall network (e.g., a laptop device relocating). Information in routing tables and overall network connectivity may represent a portion of the device state of a network communication device.

In general, a switch may be thought of as a device in a computer network that connects together other devices ("nodes" of the network). Multiple data cables may be plugged into a switch to enable communication between different networked devices. Switches manage the flow of data across a network by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

As explained further below, some network communication devices are "hybrid" devices in that they perform more than one classification of service. That is some switches may also be routers and some routers may also be switches and have hubs as part of their architecture. Accordingly, there are a variety of network communication devices (commonly referred to as switches, hubs, routers, etc.) that may benefit from the concepts of this disclosure. Generally, embodiments of the present disclosure may provide systems and methods for the remote monitoring of network communication devices as well as remote fault analysis for such network communication devices. Such monitoring may include real time monitoring for troubleshooting and/or fault analysis as well as passive monitoring that may allow data to be accumulated over time to facilitate performance and use monitoring.

Network communication devices, such as switches, routers, and the like may be housed in data centers and may be used to connect servers and other computing devices within the data center. Monitoring of such network communication devices may require the manual connection of a user-specific data collection mechanism, such as cables, thereby allowing users to individually collect data from specified network communication devices. Other methods of monitoring and collecting data may include collecting switching device statistics from specified devices within the data center and then caching the collected data within the data center. Such systems include in data center computing and storage resources to cache and process the collected data. However, such solutions do not provide for monitoring or performing fault analysis on switching devices distributed over multiple data centers. In order to collect and collate data from multiple data centers, in data center computing and storage solutions are installed in each data center.

The data collection and processing systems described above may introduce security risks to the network and/or also require provisioning hardware and software to provide the solutions within each data center. With respect to security risks, the process for updating software for the systems is a cumbersome and elaborate process due to the sensitive location of the computing systems within the data centers. Regarding provisioning, computing resources require medium to high computing power due to the types of software used. Additionally, caching large amounts of collected data requires in data center storage provisioning solutions.

By shipping data to authenticated and authorized users, on demand, to remote facilities, the present disclosure may provide for remote monitoring and fault analysis solutions that do not require in data center processing and storage provisioning. Various implementations of such remote monitoring and fault analysis solutions are discussed in detail below with respect to the Figures and following discussion.

Turning to FIG. 1, a schematic representation for the remote monitoring of network communication devices within a data center is shown according to one or more embodiments. A data center 100 houses various computing systems and associated devices in a centralized location. Data center 100 may include servers 105, which share computing resources such as central processing units and memory over a network (not shown). In this implementation, data center 100 is illustrated as including six servers 105, however, in other implementations more or less than six servers 105 may be used.

Data center 100 also includes one or more network communication devices, which in this implementation are switches 110. In other implementations, other types of data transfer devices, including by no limitation, routers, bridges, hybrids, and the like, may also benefit from the present disclosure. Switches 110 are used to connect network components, such as servers 105, as well as other devices (not shown) within a network. Switches 105 may thereby provide connectivity between such devices by using packet switching to receive, process, and forward data to a destination device. As illustrated, data center 100 includes four switches 110, however, in other implementations, data center 100 may include more or less than four switches 110. Switches 110 may be connected to each other, as well as provide connections to one or more of the servers 105 or other network communication devices. In this implementation, each switch 110 is connected to each server 105. In alternative implementations, switches 110 may provide connections between select servers 105 or other network communication devices.

Switches 110 may have or be connected to storage solutions, thereby allowing switch data to be cached locally on a specific switch 110. In one implementation, a certain switch 110 may include a local storage device 115, such as onboard memory. Switches may also be connected to an external storage device 120, such as hard disk drives. Those of skill in the art having benefit of the present disclosure will appreciate that storage solutions may include any device or components capable of storing data about the switch, regardless of the location of such storage solution.

One or more storage solutions (e.g., local storage device 115 and external storage device 120) may be used to store a network communication device operation dataset 127. The network communication device operation dataset 127 may include the data discussed above and below, and as such, may store information about how switches 110 or other network communication devices operate. Examples of such data that may be included in the network communication device operation dataset 127 include without limitation, CPU utilization, telemetry period, telemetry count, telemetry value, canonical port name, port number, time information, counts for inbound octets, counts for outbound octets, counts for inbound packets, counts for outbound packets, errors, discards, number of input datagrams; received from interfaces, number of input datagrams not at final destination, number of input datagrams discarded due to errors in IP headers, number of frames received by a port, number of frames outputted by a port, number of port discards, number of port drops, number of kilobits received, number of kilobits transmitted, number of kilobytes received, number of kilobytes transmitted, packets received per second, packets transmitted per second, number of unicast and non-unicast packets, number of broadcast packets, number of oversize packets, number of pause frames, quality of service counters, and various other data related to network communication devices such as those described above.

The data center 100 and, more specifically, one or more of the switches 110 may be connected to management tool 125 located at a remote location 130. Management tool 125 may include a converged infrastructure management platform for administration of a software-defined system for data centers 100. Such a converged infrastructure management platform may provide software for data center management including compute, networking, servers, storage, network communication devices, and visualization tools.

Remote location 130 may be connected to data center 100, and thus switches 110, thereby allowing data from the switches 110 to be sent to remote location 130. Remote location 130 includes any place not located in data center 100. Remote location 130 may have storage solutions (not illustrated) that store data received from data center 100. Examples of storage solutions may include, for example, disk drives capable of storing data received from data center 100.

In order to provide communication between data center 100 and remote location 130, data center 100 may further include an external communication device 140. The external communication device 140 may be operatively connected to switches 110 and other network communication devices in data center 100. Similarly, remote location 130 may also have an external communication device 145. The remote location 130 external communication device 145 may be operatively connected to management tool 125 and/or user 135. Furthermore, the two external communication devices 140/145 may be operatively connected to one another, thereby allowing for communication between data center 100 and remote location 130. Examples of external communication devices 140/145 may include various wired and wireless connections that allow for transmission of data between data center 100 and remote location 130.

During operation, a user 135 operating management tool 125 may access data provided from data center 100 that has been collected from switches 110 and transferred from data center 100 to remote location 130. The transferred data may include various information and statistics about switches 110, which are described above with respect to the discussion of the network communication device operation dataset 127. As used herein, user 135 may include a human user or a software program using management tool 125 to access the data provided from data center 100.

As illustrated in FIG. 1, management tool 125 and user 135 are shown located at the same remote location 130. In alternative implementations, management tool 125 and user 135 may be located at different remote locations 130. In such an implementation, user 135 may be located at a first remote location and management tool 125 may be located at a second remote location. The first and second remote locations 130 may be connected, thereby allowing the user 135 to request information about data center 100 using management tool 125.

Implementations of the present disclosure may also include other physical variants. For example, in certain implementations, management tool 125 may be used to access data about more than one data center 100. In such an implementation, management tool may be, used to gather data from two or more data centers 100, thereby allowing the data to be collated and processed to analyze the operation of switches 110 across multiple locations. In certain situations, user 135 may also include multiple users 135, such as multiple human users 135, multiple software users 135, or combinations of human and software users 135. In still other implementations, management tool 125 may have access to data from data center 100 that is stored remotely from data center 100, but not necessarily at remote location 130.

Operational dynamics of user 135 requests and management tool 125 implementation is discussed in detail below with respect to FIGS. 2, 3, and 4.

Figure 2:
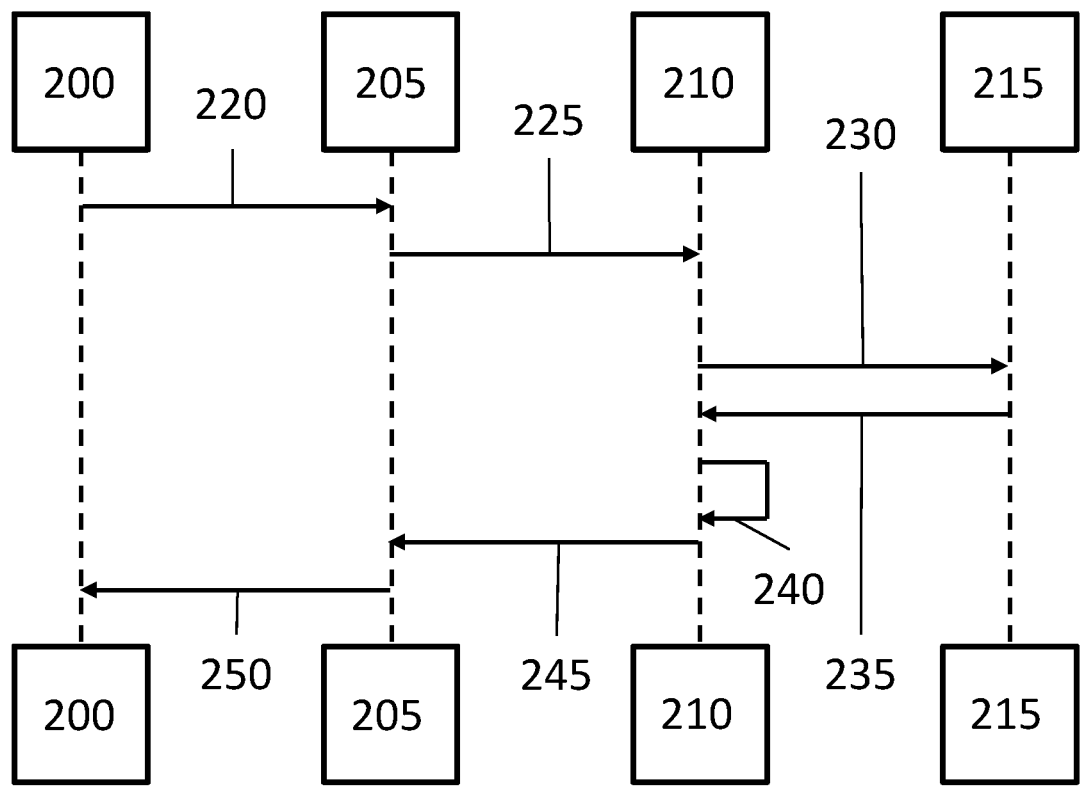
FIG. 2 is an operational flow schematic for the remote monitoring of network communication devices within a data center in accordance with one or more example embodiments.

Referring to FIG. 2, an operational flow schematic for the remote monitoring of network communication devices within a data center such as the data center 100 of FIG. 1 is shown according to one or more embodiments. In this implementation, data is requested and a user waits until the request is fulfilled. In operation, a user 200 at a remote location may use management tool 205 to access data collector 210 from network communication devices 215 located in remote data centers. Initially, the user 200 submits a request 220 to management tool 205. In the user request 220, the user 200 defines the parameters of the request 220, including, for example, attribute parameters, time parameters, and delivery parameters.

Attribute parameters may include, for example, one or more network communication devices from which data may be collected. Network communication devices may include switches, interconnects, or any of the network communication devices discussed above. The data collected may include statistical information about the network communication device or devices.

Time parameters may include one or more of a point in time defining the commencement of data collection, a specification of intervals (starting from the commencement point in time) at which data is collected, and a specification of either how many times the data is collected or an ending point in time when collection should stop. In certain implementations all three time parameters are defined in the request, thereby providing start, stop, and frequency variables for the collection of data.

Delivery parameters may include how the data collected is delivered to the user 200. Examples of delivery parameters may include direct messaging, email, file systems, file transfer protocol ("FTP"), secure shell (ABCSSH"), secure shell file transfer protocol ("SFTP"), secure copy protocol ("SCP"), or other methods of transmitting data. The delivery parameters may further include context information, such as security variables, for accessing the user 200, management tool 205, network communication devices, 215, or any other component that requires access during delivery of the data.

After the user 200 submits a request 220, the management tool 205 processes 225 the request 220 through data collector 210. In this implementation, processing 225 the request 220 includes sending 230 the request 220 to a network communication device 215 or multiple network communication devices 215 because the data requested has not previously been collected. In other implementations, the request 220 may be processed through data collector 210, thereby allowing previously collected data to be provided to the user 200.

After the data is collected from the network communication device 215, the data is sent 235 to data collector 210 to filter 240 parameters that were not in the initial request 220. Parameters may include, but are not limited to, time information, data type, and one or more parameters from the network communication device operation dataset (provided above).

The filtered 240 data is then sent 245 to management tool 205, at which point the management tool 205 may provide a user 200 access 250 to the data. Because in this implementation the data was not previously collected, the user 200 is required to wait for the data to be collected from the network communication device 215 or devices. In other implementations, data may be processed from a prior collection, may be stored for later analysis, or be delivered according to a defined schedule.

Figure 3:
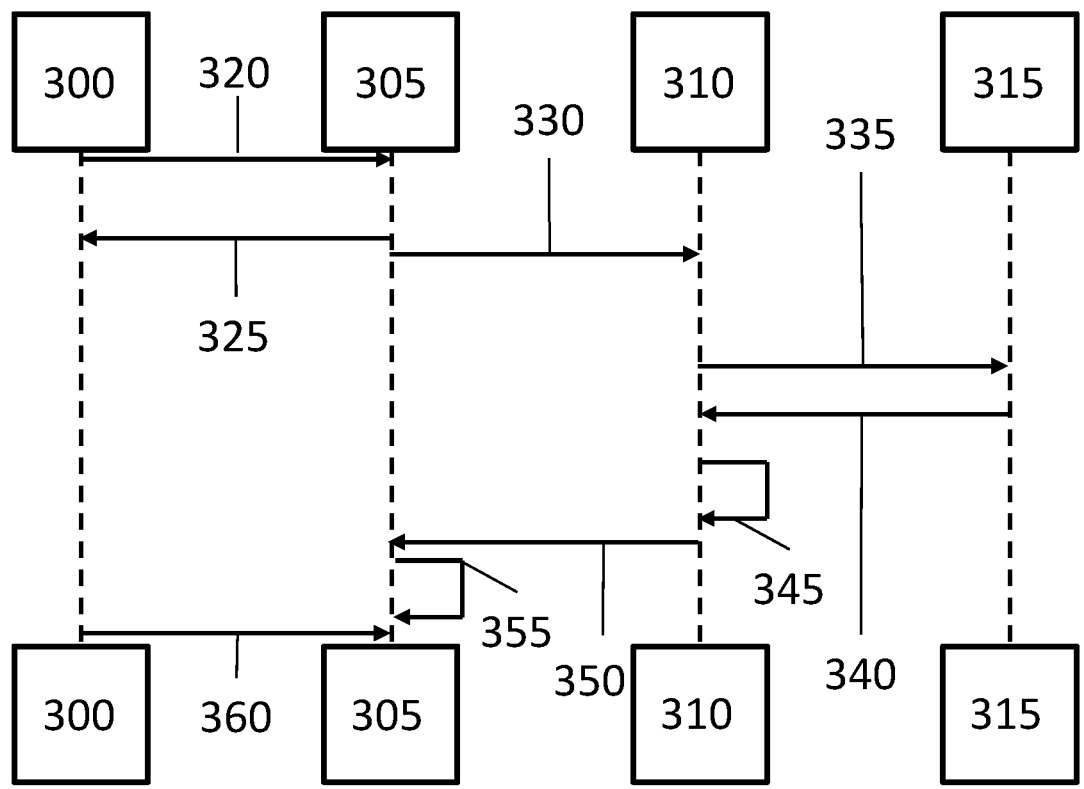
FIG. 3 is an operational flow schematic for the remote monitoring of network, communication devices within a data center in accordance with one or more example embodiments.

Referring, to FIG. 3, an operational flow schematic for the remote monitoring of network communication devices within a data center is shown according to one or more embodiments. In this implementation, data may be requested by a user, the request may be processed, then the used may come back at a later time and retrieve the requested data. In operation, a user 300 may use management tool 305 to access data collector 310 from network communication devices 315 located in remote data centers. As explained above with respect to FIG. 2, the user 300 submits a request 320 to management tool 305. In the user request 320, the user 300 defines the parameters of the request 320, including attribute parameters, time parameters, and delivery parameters.

After, or contemporaneous with, the submission of the request, management tool 305 may provide 325 user 300 a download protocol. The download protocol may thereby allow user 300 to access collected data, as the data becomes available. Thus, a user may be allowed to incrementally retrieve data as it is collected. In other implementations, the download protocol may provide links to access entire data sets, subsets, or other types of information as it becomes available. The download protocol may include links to web portals that authenticated and authorized users may access. In other implementations, the download protocol may include login credentials so authenticated and authorized users may access data stored in management tool 305 or otherwise access implementation specific software.

After the user 300 submits a request 320 the management tool 305 processes 330 the request 320 through data collector 310. In this implementation, processing 330 the request 320 includes sending 335 the request 320 to a network communication device 315 or multiple network communication devices 315 because the data requested has not previously been collected.

After the data is collected from the network communication device 315, the data is sent 340 to data collector 310 to filter 345 parameters that were not defined in the initial request 320. The filtered 345 data is then sent 350 to management tool 305, at which point the management tool 305 makes the data available 355 through the download protocol that has previously been provided 325 to user 300. The user may then access 360 the data through the download protocol. As explained above, because the data may be incrementally available, user 300 may repeat the accessing 360 collected data multiple times for one request 320.

Figure 4:
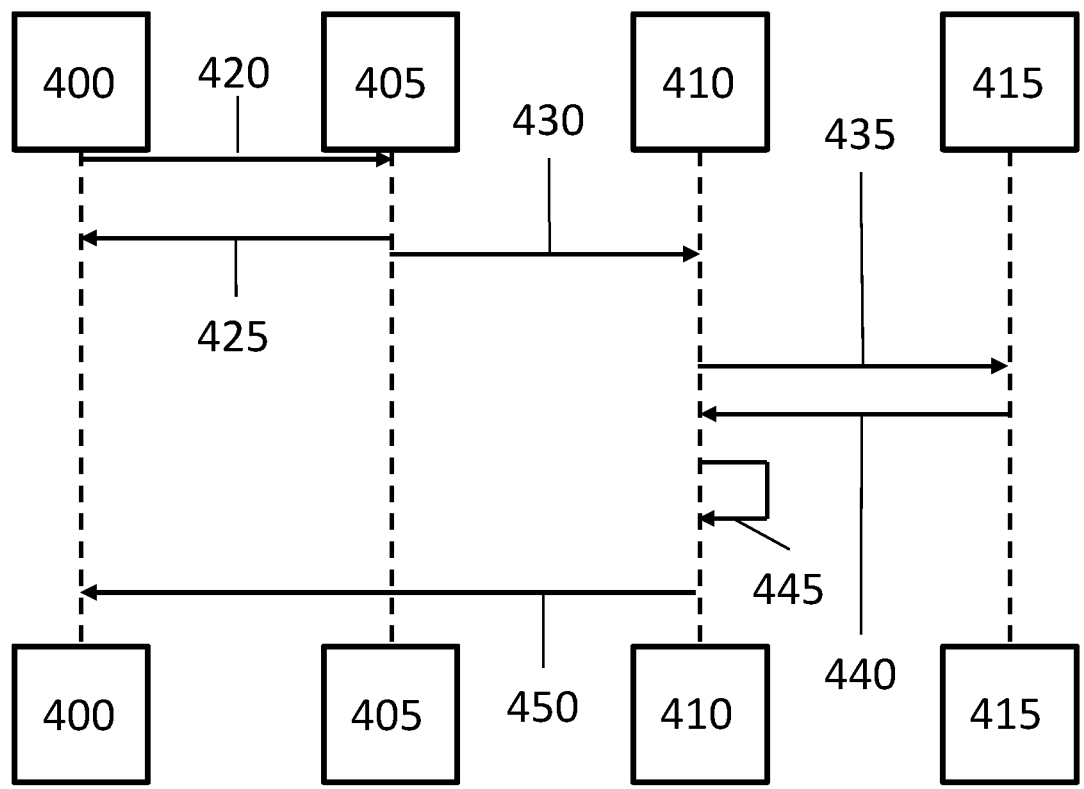
FIG. 4 is an operational flow schematic for the remote monitoring of network communication devices within a data center in accordance with one or more example embodiments.

Referring to FIG. 4, an operational flow schematic for the remote monitoring of network communication devices within a data center is shown according to one or more embodiments. In this implementation, collected data is autonomously delivered to a user as the data becomes available. In operation, a user 400 may use management tool 405 to access data collector 410 from network communication devices 415 located in remote data centers. As explained above with respect to FIGS. 2 and 3, the user 400 submits a request 420 to management tool 405. In the user request, the user 400 defines the parameters of the request 420, including attribute parameters, time parameters, and delivery parameters.

After or contemporaneous with the submission of the request, management tool 405 may provide 425 user 400 a download protocol. The download protocol may thereby allow user 400 to access collected data, as the data becomes available. Thus, a user may be allowed to incrementally retrieve data as it is collected. In other implementations, the data may be retrieved as a complete dataset, a subset, or other collections of data as may be specified by the user in the request 420.

After the user 400 submits a request 420 the management tool 405 processes 430 the request 420 through data collector 410. In this implementation, processing 430 the request 420 includes sending 435 the request 420 to a network communication device 415 or multiple network communication devices 415 because the data requested has not previously been collected.

After the data is collected from the network communication device 415, the data is sent 440 to data collector 410 to filter out 445 parameters that were not in the initial request 420. The data is then sent 450 directly to the user 400. The data may be delivered as it becomes available, as a complete dataset, as a subset, or though other delivery options as defined by the user 400 in the original request 420. In certain implementations, the collected data may also be sent 450 to both user 400 and management tool 425 or may be sent 450 to management tool 425 and then subsequently sent 450 to user 400.

Figure 5:
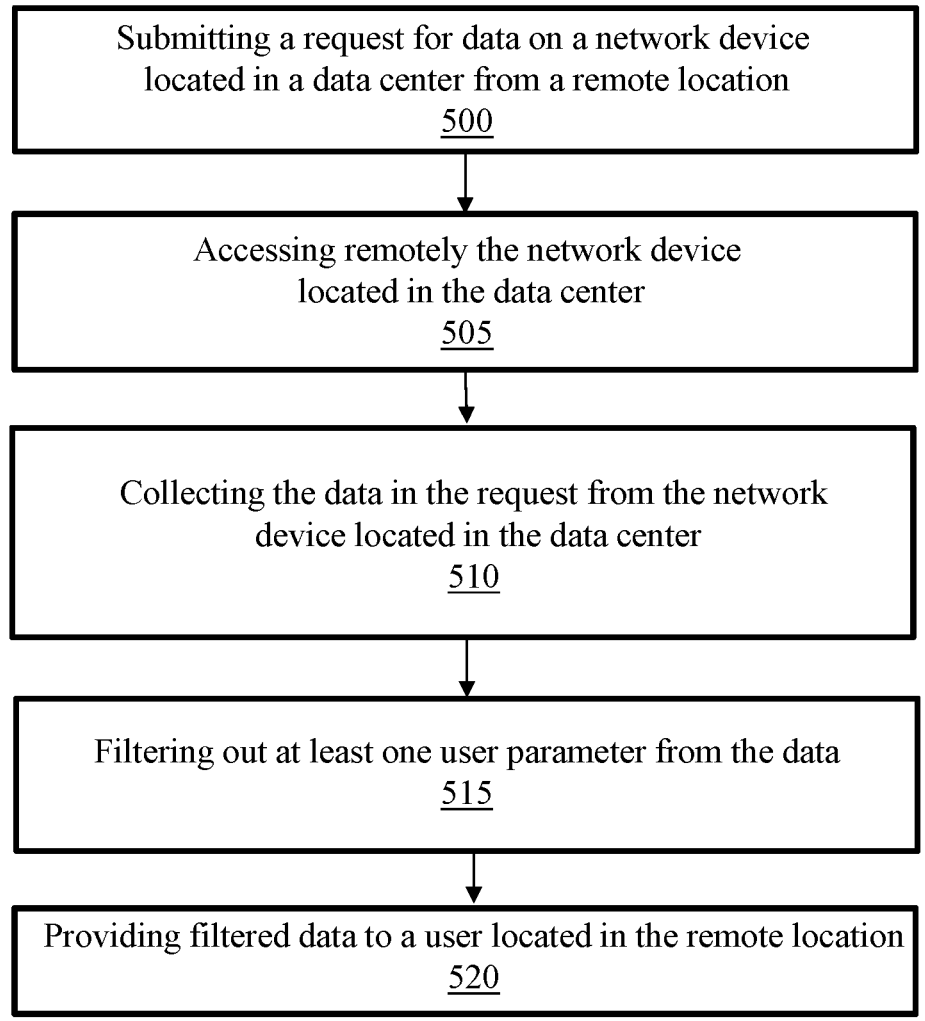
FIG. 5 is a flowchart of a method for remotely accessing network communication device data in a data center in accordance with one or more example embodiments

Referring to FIG. 5, a flowchart of a method for remotely accessing network communication device data in a data center is shown in accordance with one or more example embodiments. This method initially may provide for submitting (500) a request for data on a network communication device located in a data center from a remote location. As discussed above, the data center and the remote location are physically separated but may communicate through one or more external communication devices that allows for either wired or wireless transmission of data therebetween. The request for data may include various types of information including, but not exclusively limited to attribute parameters, time parameters, and delivery parameters.

In certain implementations, the request may further include requesting data on a second network communication device located in the data center. Accordingly, the request may provide for the acquisition of data from multiple network communication devices located in a single data center. In operation, a data center may have hundreds of network communication devices and the request may further include a request for data for most or even all the network communication devices in the data center. In such implementations, the request may thereby provide a user information about the operative status of the data center by providing data on the operative status of individual components within the data center.

In other implementations, the request may further include requesting data on a second network communication device located in a second data center. In such a situation, the request would allow a user to query one or more network communication devices located in different locations remote from each other. The data may then be collated, allowing a user to have information about the operative status of more than one data center, each data center having one or more network communication devices. In operation, each data center may include hundreds or thousands of devices for which information may be requested. Accordingly, the request may effectively provide data that a user may process in order to determine an operative status of one or more network communication devices located in one or more different locations from a location remote from the data centers. The number of network communication devices and data centers is indicated for illustrative purposes only. In other implementations there may be tens or hundreds of data centers that may be accessible from a remote location. In such a situation, each data center may include hundreds or thousands of components including network communication devices that may provide data to a remote user.

After the submitting (500) the request, the method may include accessing (505) remotely the network communication device located in the data center. The accessing (505) the data may include using the attribute parameter to select specific network communication devices and gain access to the network communication devices specified in the request. For example, an attribute parameter in the request may request data on a specific network communication device, while in other examples, the attribute parameter may specify more than one network communication device. The accessing (505) may also include determining whether data is stored in a centralized location in the data center or whether the data is stored locally on individual network communication, devices.

After the network communication device is accessed (505), the method may include collecting (510) the data in the request from the network communication device located in the data center. The collecting (510) the data may include using the attribute and time parameters to select specific network communication devices and collect data, from the network communication devices according to the requested time parameters. The collecting (510) may include fetching data locally from one or more network communication devices and making the data available to the remote location. Collecting (510) may further include pulling data previously collected from network communication devices that is stored at the data center. In certain implementations, the collecting (510) may occur in real time or substantially real time, thereby allowing data from network communication devices to be collected as events occur. In other implementations, the data that is collected (510) may be stored at the data center, in memory on individual network communication devices, or through memory externally connected to network communication devices.

The collecting (510) may further include processing the time parameter identified in the request. The time parameter may specify a start time, a stop time, and a frequency. The start time indicates when the collecting (510) should start, while the stop time indicates when the collecting (510) should stop. The frequency defines how often within the time period identified by the start and stop data should be collected (510). In operation, start and stop times may identify actual times that are defined as, seconds, minutes, hours, or days. In such a situation, the frequency may then define how often every second, minute, hour, or day the data is collected (510). In other implementations, that start, and stop may define a specific time and, a frequency of one may indicate that a single data collection (510) occurs. Depending on operational requirements, the stop, start, and frequency time parameters may vary to meet the requirements of the implementation.

After the data is collected (510), filtering (515) at least one user parameter from the data may occur. The filtering (515) may include using one or more parameters of the network communication device operation dataset, as explained above. In certain implementations, a user may request only a single parameter, while in other implementations, the user may require numerous parameters.

After the data is filtered (515), the method may include providing (520) the filtered data to a user located in the remote location. In certain implementations, the filtered (515) data may be sent directly to a user that is authenticated and authorized to access the data. In, other implementations, the providing (520) may include sending the filtered (515) data to a management tool. The management tool may thereafter provide the filtered (515) data to the user. Depending on, for example, the delivery parameters defined in the request, the data may be delivered either directly to the user or through the management tool. In certain implementations, the data may be delivered to the user through the management tool as the data becomes available. In such a situation, incremental data may become available and be accessible through, the management tool, thereby allowing the user to follow a download protocol to access the data.

The methods identified above may thereby allow for the remote access of data for network communication devices, such as switches and the like, without requiring in data center processing and storage facilities. In certain implementations, specific data centers may have on site processing and storage. In these situations, methods of the present disclosure may still provide remote access to the data, thereby allowing a user to access the data without physically having to be present at the data center. Methods described herein may further provide for data to be externally collected from multiple data centers from a remote location. By providing remote access to the data, potential security risks may be avoided, thereby further securing the information processed and stored in the data centers.

The methods discussed above may further allow for the remote monitoring of one or more network communication devices within one or more data centers. Remote monitoring may thereby allow for problems with, network communication devices to be identified, thereby improving the operability of data centers. Such methods may also allow for fault analysis to be performed from a remote location. By identifying faults in a network, the operational dynamics of a data center may be improved, thereby providing faster processing and transmission of data within the network.

In certain implementations, user requests may be fulfilled based on system loads and deployment configurations. Thus, if system load is relatively high, the user request may be delayed until system load is within an acceptable parameter. However, high system load may also identify a potential fault in the network, and a user may accelerate the request in order to determine if high system load is the result of a network fault.

Implementations of the present methods may further allow for topology information about relative network communication devices to be determined. By collecting data from multiple network communication devices in a relative area of the network, a local topology may be created, thereby allowing users to identify operational dynamics of the local topology. Similarly, as data is collected on more network communication devices the topology may be expanded, thereby allowing a user to build a complete or substantially complete network topology. This network topology may then be used in order to optimize network components and component configuration. Such network optimization may provide faster processing and transfer speeds, as well as decrease network faults, increase reliability, and provide better network stability.

Figure 6:
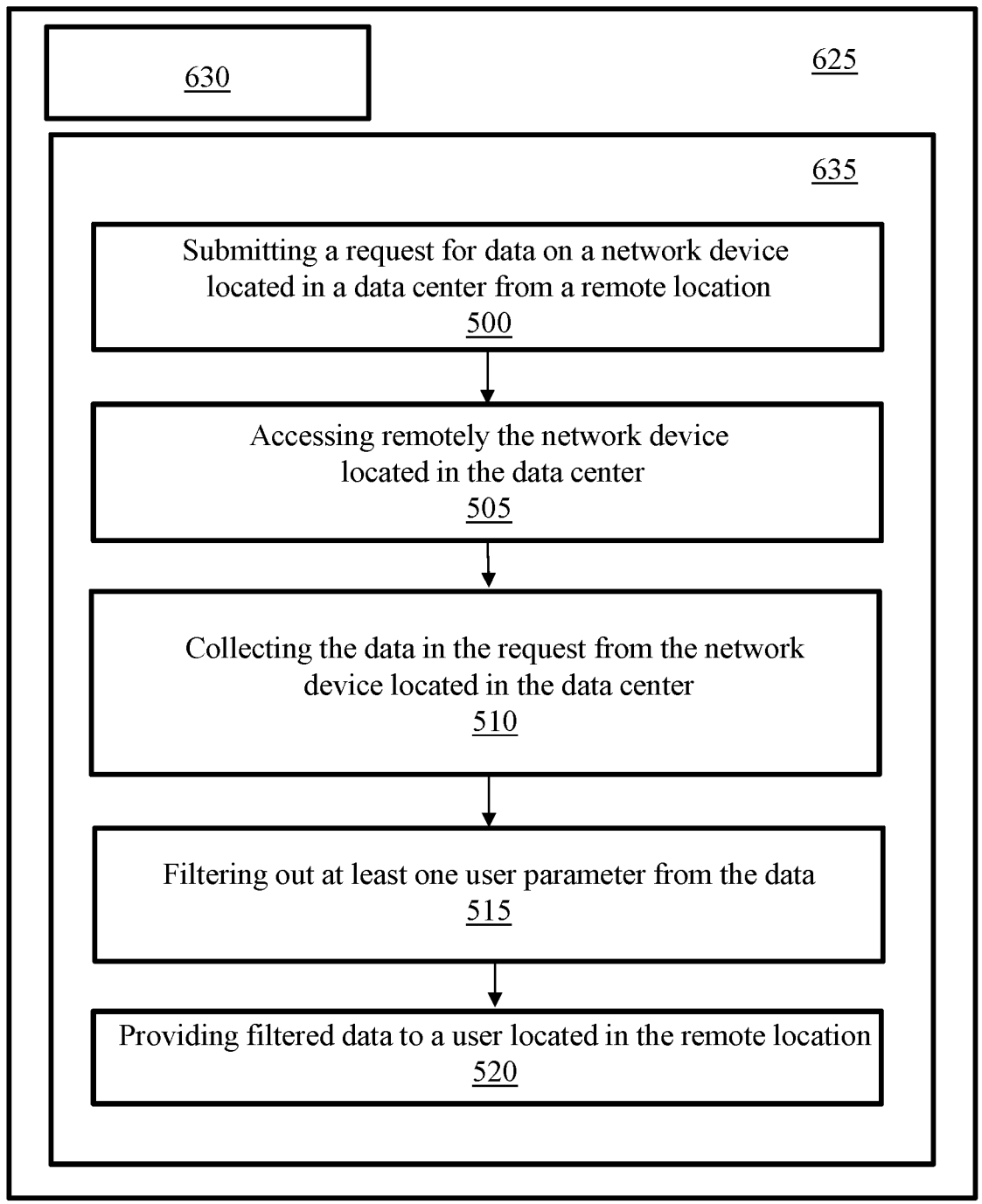
FIG. 6 is an example computing device with a hardware processor and accessible machine-readable instructions in accordance with one or more example embodiments.

Referring to FIG. 6, an example computing device with a hardware processor and accessible machine-readable instructions is shown in accordance with one or more example embodiments. FIG. 6 provides is an example computing device 625, with a hardware processor 630, and accessible machine-readable instructions stored on a machine-readable medium 635 for performing the remote monitoring discussed above with respect to one or more disclosed example implementations. FIG. 6 illustrates computing device 625 configured to perform the flow described in blocks 500, 505, 510, 515, and 520, discussed in detail with respect to FIG. 5. However, computing device 625 may also be configured to perform the flow of other methods, techniques, functions, or processes described in this disclosure.

A machine-readable storage medium, such as 635 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 7:
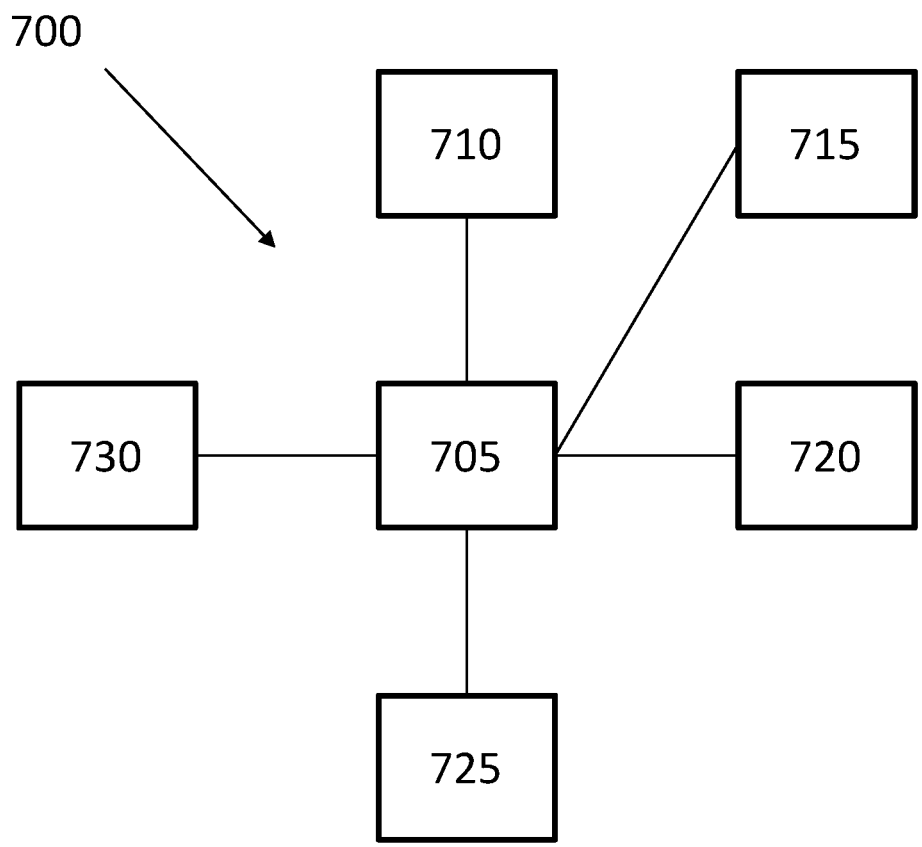
FIG. 7 is a schematic representation of a computer processing device that may be used to implement functions and processes in accordance with one or more example embodiments.

Referring to FIG. 7, a schematic representation of a computer processing device that may be used to implement functions and processes in accordance with one or more example embodiments is shown. FIG. 7 illustrates a computer processing device 700 that may be used to implement the systems, methods, and processes of this disclosure. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could, be implemented using emulators or virtual machines as levels of abstraction. In any case, no matter how many levels of abstraction away from the physical hardware, computing device 700 at its lowest level may be implemented on physical hardware. In one implementation, computing device 700 may allow a user to remotely access one or more data centers. Similarly, the management tool used by the user may include a software solution that runs on such a computing device 700.

As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured, as input/output devices also (e.g., a network, interface or touchscreen display).

Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication ("PLC"), WiFi, cellular, and/or other communication methods. This communications interface 725 may thereby allow the user to communicate with the data center remotely. Such computing devices 725 may be, either in totality or as a component feature, the external communication devices discussed above with respect to the data center and remote location discussed in FIG. 1.

Computing device 700 includes a processing element such as processor 705 that contains one or more hardware processors, where each hardware processor may have a single or multiple processor cores. In one embodiment, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 ("L2"), level 3 ("L3"), level 4 ("L4"), or other levels of cache, a last level cache ("LLC"), or combinations thereof. Examples of processors include but are not limited to a central processing unit ("CPU") a microprocessor. Although not illustrated in FIG. 7, the processing elements that make up processor 705 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 7 illustrates that memory 710 may be operatively and communicatively coupled to processor 710. Memory 710 may be a non-transitory medium configured to store various types of data. For example, memory 710 may include one or more storage devices 720 that comprise a non-volatile storage device and/or volatile memory. Volatile memory, such as random-access memory ("RAM"), can be any suitable non-permanent storage device. The non-volatile storage devices 720 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that, the processor 705 is able to execute the programming code. For example, the compiling process of the software program may generate an executable program that, provides encoded instructions (e.g., machine code instructions) for processor 705 to accomplish specific, non-generic, particular computing functions.

After the compiling process, the encoded instructions may then be loaded as computer executable instructions or process steps to processor 705 from storage device 720, from memory 710, and/or embedded within processor 705 (e.g., via a cache or onboard ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 1000 may comprise other components well known in the art, such as sensors, powers sources, and/or analog-to-digital converters, not explicitly shown in FIG. 7.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of, one or more example embodiments may include one or more of the following:

In one or more examples, systems and methods disclosed herein may be used to provide for the remote monitoring of network communication devices located in data centers.

In one or more examples, systems and methods disclosed herein may be used to allow for data access for network communication devices without requiring in data center processing and storage facilities.

In one or more examples, systems and methods disclosed herein may be used to remotely collect data from multiple data centers.

In one or more examples, systems and methods disclosed herein may be used to provide fault analysis about network communication devices in data centers from a remote location.

In one or more examples, systems and methods disclosed herein may be used to optimize data center networks through remote monitoring.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope, of claims below as illustrated by the example embodiments disclosed herein. Accordingly, the scope of the protection sought should be limited only by the appended claims.

What is claimed is:

1. A method of remotely accessing data on a network communication device, the method comprising:
   submitting a request for data on a network communication device located in a data center from a remote location;
   accessing remotely the network communication device located in the data center;
   collecting the data in the request from the network communication device located in the data center;
   filtering a user parameter from the data; and
   providing filtered data to the remote location.

2. The method of claim 1, further comprising:
   sending the filtered data to a management tool, wherein the providing the filtered data is provided to the user by the management tool.

3. The method of claim 1, further comprising:
   providing a download protocol to the user at the remote location.

4. The method of claim 3, further comprising:
   accessing the filtered data through the download protocol from the remote location.

5. The method of claim 1, wherein the request comprises an attribute parameter, a time parameter, and a delivery parameter.

6. The method of claim 1, wherein the at least one user parameter comprises at least one of a CPU utilization value, a telemetry period, a telemetry count, a telemetry value, a canonical port name, a port number, a time information, a count for inbound octets, a count for outbound octets, a count for inbound packets, a count for outbound packets, an error, a discard, a number of input datagrams received from interfaces, a number of input datagrams not at final destination, a number of input datagrams discarded due to errors in IP headers, a number of frames received by a port, a number of frames outputted by a port, a number of port discards, a number of port drops, a number of kilobits received, a number of kilobits transmitted, a number of kilobytes received, a number of kilobytes transmitted, a number of packets received per second, a number of packets transmitted per second, a number of unicast and non-unicast packets, a number of broadcast packets, a number of oversize packets, a number of pause frames, and a quality of service counter.

7. The method of claim 1, wherein the submitting the request further comprises:
   requesting data on a second network communication device located in the data center.

8. The method of claim 1, wherein the submitting the request further comprises:
   requesting data on a second network communication device located in a second data center.

9. A non-transitory computer readable medium comprising computer executable instructions stored thereon that when executed by one or more processing units perform a method to remotely access a network communication device data in a datacenter, the method comprising:
   receiving a request for data on a network communication device located in the data center;
   accessing remotely the network communication device located in the data center;
   collecting the data in the request from the network communication device located in the data center;
   filtering out at least one user parameter from the data; and
   providing filtered data to a user located at the remote location.

10. The computer implemented method of claim 9, wherein the request comprises an attribute parameter, a time parameter, and a delivery parameter.

11. The computer implemented method of claim 10, wherein the attribute parameter comprises a network communication device location.

12. The computer implemented method of claim 10, wherein the time parameter comprises a start variable, a stop variable, and a frequency variable.

13. The computer implemented method of claim 9, wherein the submitting the request further comprises:
   requesting data on a second network communication device located in the data center.

14. The computer implemented method of claim 9, wherein the submitting the request further comprises:
   requesting data on a second network communication device located in a second data center.

15. The computer implemented method of claim 9, further comprising:
   providing a download protocol to the user at the remote location.

16. The method of claim 15, further comprising:
   accessing the filtered data through the download protocol from the remote location.

* * * * *